US012797293B2

(12) United States Patent
Castellote et al.

(10) Patent No.: US 12,797,293 B2
(45) Date of Patent: Nov. 17, 2026

(54) MANIFOLD FOR AIR MASSAGE SYSTEM OF TUB

(71) Applicants: Miguel Castellote, Ste-Marguerite-de-Dorchester (CA); Dominique Ciechanowski, Ste-Marguerite-de-Dorchester (CA)

(72) Inventors: Miguel Castellote, Ste-Marguerite-de-Dorchester (CA); Dominique Ciechanowski, Ste-Marguerite-de-Dorchester (CA)

( * ) Notice: Subject to any disclaimer, the term of this patent is extended or adjusted under 35 U.S.C. 154(b) by 1094 days.

(21) Appl. No.: 17/859,600

(22) Filed: Jul. 7, 2022

(65) Prior Publication Data

US 2023/0017985 A1 Jan. 19, 2023

Related U.S. Application Data

(60) Provisional application No. 63/222,645, filed on Jul. 16, 2021.

(51) Int. Cl.
*A61H 33/02* (2006.01)

(52) U.S. Cl.
CPC ....... *A61H 33/02* (2013.01); *A61H 2033/023* (2013.01)

(58) Field of Classification Search
CPC .. A61H 33/0091; A61H 33/02; A61H 33/021; A61H 33/026; A61H 33/027; A61H 33/028; A61H 2033/021; A61H 2033/022; A61H 2033/023; A61H 35/00–04; A47K 3/10

(Continued)

(56) References Cited

U.S. PATENT DOCUMENTS 3,378,030 A * 4/1968 Cary ..................... F16K 15/026 137/515.7
5,584,315 A * 12/1996 Powell .................... F16K 15/03 137/454.2

(Continued)

FOREIGN PATENT DOCUMENTS

CN 110513512 A * 11/2019 ............. F16K 15/03
CN 112032369 A * 12/2020 ......... F16K 15/1821
KR 20180007789 A * 1/2018 ............... G05G 1/30

OTHER PUBLICATIONS

Translation of KR 20180007789-A. Accessed from PE2E Search on Jun. 25, 2025. (Year: 2018).*

(Continued)

*Primary Examiner* — Paige Kathleen Bugg
(74) *Attorney, Agent, or Firm* — NORTH ROSE FULBRIGHT CANADA LLP

(57) ABSTRACT

A manifold for an air massage system of a tub may have a housing defining an inner cavity having an air inlet configured to be pneumatically connected to a pressure source. Air outlet(s) is pneumatically connected to one or more outlets of the tub. A check valve(s) is in the inner cavity of the housing, the at least one check valve being positioned between the air inlet and the at least one air outlet relative to an air flow through the housing, the at least one check valve allowing fluid communication from the air inlet to the at least one air outlet and blocking water from flowing from the at least one air outlet to the air inlet. A width of the manifold is less than a height of the manifold.

19 Claims, 9 Drawing Sheets

(58) Field of Classification Search
USPC .................................................. 601/156–157
See application file for complete search history.

(56) References Cited

U.S. PATENT DOCUMENTS

| | | | | |
|---|---|---|---|---|
| 2003/0233704 | A1* | 12/2003 | Castellote .............. | A61H 33/02 4/541.5 |
| 2007/0079436 | A1* | 4/2007 | Na ......................... | A61H 33/60 4/541.1 |
| 2008/0010738 | A1* | 1/2008 | Reinhart ................ | A61H 33/60 4/541.6 |
| 2011/0252558 | A1* | 10/2011 | Ciechanowski ..... | A61H 33/027 239/8 |
| 2013/0019966 | A1* | 1/2013 | Hawa ........................ | F16K 1/22 137/511 |
| 2013/0233412 | A1* | 9/2013 | Moren .................. | F16K 15/033 251/364 |
| 2016/0230678 | A1* | 8/2016 | Layne ................... | F16K 11/044 |

OTHER PUBLICATIONS

Translation of CN 110513512. Accessed from PE2E-Search on Aug. 13, 2026. (Year: 2019).*
Translation of CN 112032369. Accessed from PE2E-Search on Aug. 13, 2026. (Year: 2020).*

* cited by examiner

MANIFOLD FOR AIR MASSAGE SYSTEM OF TUB

CROSS-REFERENCE TO RELATED APPLICATION

This present application claims the priority of U.S. Patent Application No. 63/222,645, filed on Jul. 16, 2021 and incorporated herein by reference.

TECHNICAL FIELD

This disclosure generally relates to the field of tubs and, more particularly, to air massage systems therefor.

BACKGROUND OF THE ART

Tubs are well known for their primary use, namely a washroom installation in which a user person washes and bathes. Tubs have, however, evolved to add pleasure and comfort to practicality, and are found in many forms, such as bathtubs, spas and whirlpools.

Massage systems of various configurations have been provided to inject fluids, such as air or water, into the liquid of the tub, so as to procure a massaging effect for the occupant of the tub. Different types of air massage systems for tubs exist on the market. A channel system consists in making a fiberglass air cavity surrounding the tub. Numerous small holes (e.g., about an eighth of an inch of diameter) are then drilled through the tub wall. Air is directly propelled in the cavity by a blower and then escapes by each of the holes to create turbulence in the water, and procure a massaging effect to the tub user. Another type of system employs a network of pipes that are connected to fittings or like jets connected to a surface of the tub, for the tub to inject air into the tub water.

SUMMARY

In one aspect, there is provided a manifold for an air massage system of a tub comprising: a housing defining an inner cavity having an air inlet configured to be pneumatically connected to a pressure source, at least one air outlet configured to be pneumatically connected to one or more outlets of the tub, and at least one check valve in the inner cavity of the housing, the at least one check valve being positioned between the air inlet and the at least one air outlet relative to an air flow through the housing, the at least one check valve allowing fluid communication from the air inlet to the at least one air outlet and blocking water from flowing from the at least one air outlet to the air inlet, wherein a width of the manifold is less than a height of the manifold.

Further in accordance with the aspect, for example, the at least one check valve defines a flow output area, an aspect ratio of the flow output area being greater than one.

Still further in accordance with the aspect, for example, the at least one check valve defines a flow output area, an aspect ratio of the flow output area being of at least 2:1.

Still further in accordance with the aspect, for example, the at least one check valve includes a plurality of check valves disposed atop one another along the height of the manifold.

Still further in accordance with the aspect, for example, the plurality of check valves include three check valves.

Still further in accordance with the aspect, for example, the housing has a front wall and a rear wall, the width of the manifold extending from a plane of the front wall to a plane the rear wall.

Still further in accordance with the aspect, for example, the air inlet, the at least one air outlet are located in any of the walls connecting the front wall to the rear wall.

Still further in accordance with the aspect, for example, a water outlet may be in fluid communication with the inner cavity of the housing.

Still further in accordance with the aspect, for example, the water outlet is upstream of the at least one check valve.

Still further in accordance with the aspect, for example, the water outlet is part of a water relief valve.

Still further in accordance with the aspect, for example, a water inlet may be hydraulically connectable to a water source.

Still further in accordance with the aspect, for example, a plurality of the air outlets are distributed along a longitudinal axis of the housing.

Still further in accordance with the aspect, for example, the housing defines a plenum, the plenum communicating with each of the air outlets.

Still further in accordance with the aspect, for example, the at least one check valve is a single check valve having a height greater than a width.

Still further in accordance with the aspect, for example, a height of the housing is at least twice a width of the housing.

Still further in accordance with the aspect, for example, the housing has an inlet section, a distribution section, and a middle section between the inlet section and the distribution section, wherein the inlet section, the middle section and the distribution section concurrently defining the inner cavity of the housing.

Still further in accordance with the aspect, for example, the inlet section, the middle section and the distribution section are interconnected by overlapping joints.

Still further in accordance with the aspect, for example, the air inlet is in the inlet section, the at least one air outlet is in the distribution section, and the at least one check valve is in the middle section.

Still further in accordance with the aspect, for example, each of the inlet section, the middle section and the distribution section has a monolithic body.

Still further in accordance with the aspect, for example, there is provided an assembly comprising: a freestanding tub having an inner space between an inner wall and an outer wall; an air massage system including a pressure source, jets in fluid communication with a bathing cavity of the tub, the manifold as described above, located in the inner space, and a network interconnecting the pressure source, the jets and the manifold.

Many further features and combinations thereof concerning the present improvements will appear to those skilled in the art following a reading of the instant disclosure.

DETAILED DESCRIPTION

Figure 1:
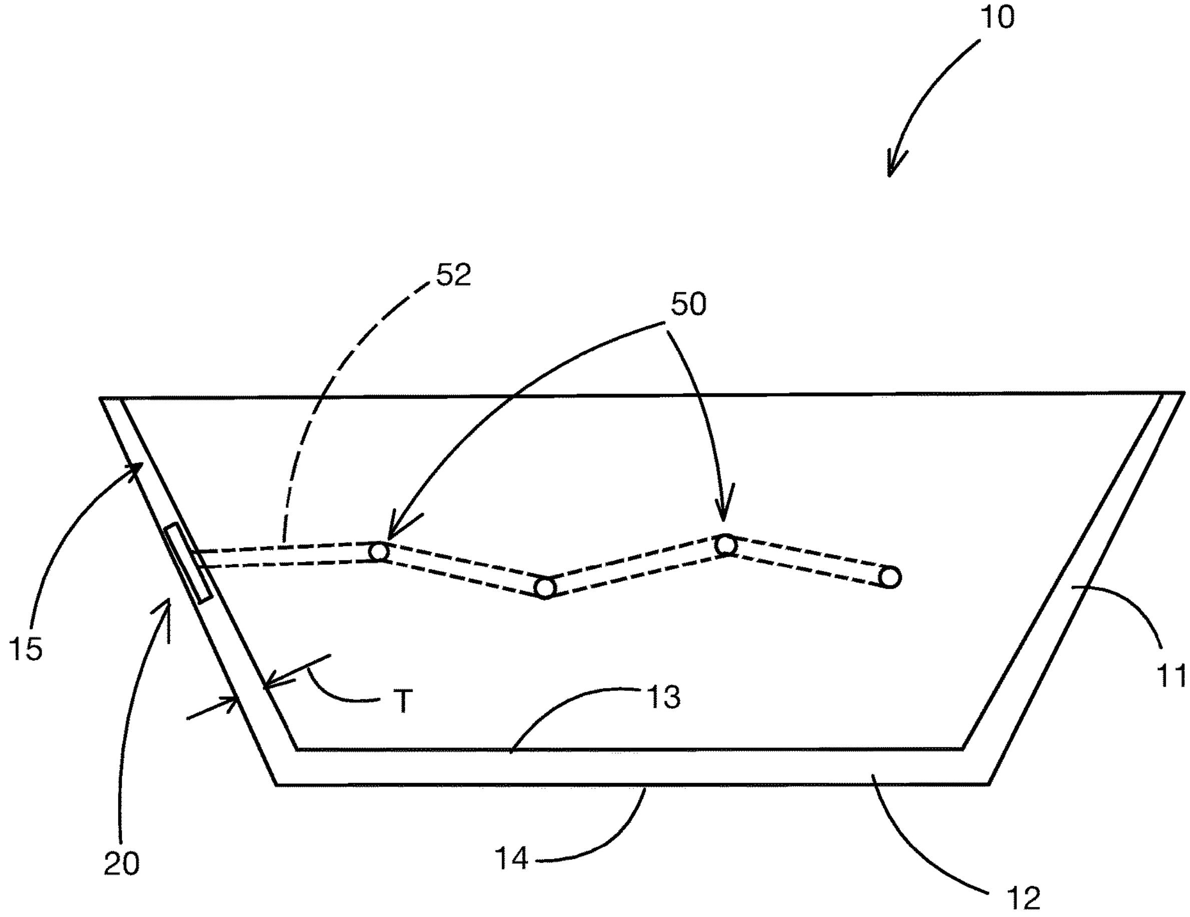
FIG. 1 is a cutaway schematic view of a bath tub in accordance with one embodiment.

Referring to FIG. 1, a bathtub, referred to below simply as "tub" is shown at 10. The expression tub is used herein to describe any such bathing cavity, and may also be referred to as bath, whirlpool, etc. The present disclosure pertains to a manifold that is well suited to be used with freestanding tubs, i.e., tubs that have a self-supporting structure as opposed to relying on a surrounding structure. The tub 10 is configured to contain water and includes sides 11 and a bottom 12, defining a bathing cavity. The sides 11 may be an assembly of a plurality of interconnected walls (a.k.a., surfaces) distributed around the bottom wall 12 and delimited by edges, or a single wall having curved portions and extending annularly all around the bottom wall 12, or a combination thereof. While the expression "interconnected walls" is used, the tub 10 may have a monolithic continuous surface, seamless (or with visible edges), with the interconnection resulting from a manufacturing process. The sides 11 protrude along a vertical direction from the bottom wall 12 to define an inner volume for receiving and containing water. The sides and bottom 11, 12 of the tub 10 have inner walls 13 and outer walls 14. A space 15 is defined between the inner and outer walls 13, 14. The inner walls 13 are wetted by water when the tub 10 contains water. If the tub 10 is a freestanding tub, both the inner walls 13 and the outer walls 14 may be visually exposed. In an embodiment, the tub 10 has at least part of the outer walls 14 concealed.

The tub 10 may be equipped with an air distribution system 20 for injecting air in the water of the tub 10. The air distribution system 20 is hydraulically connected to jets 50 for outputting a stream of air to create massaging jets for a user of the tub 10. In an embodiment, the jets 50 are holes in the walls of the tub 10, with the holes being in fluid communication with the air distribution system 20. While the expression "jet" is used, other expressions and/or device may be at the tub outlet of the air distribution system 20, such as nozzle, outlet, etc. Check valves may also be part of the jets 50 or like outlet component.

In the illustrated embodiment, the tub 10 is a self-supporting tub, commonly referred to as a freestanding tub. Such a tub has the required stiffness and/or structural integrity to be able to hold the water in the tub 10 and may be solely supported on a ground. In other words, a freestanding tub may not rely on a support structure, such as beams (e.g., 2×4) and/or a wall adjacent the tub for support. As shown, the bottom wall 12 may be laid against the ground. In some cases, legs may be appended to the tub to create an interface between the tub 10 and the ground. The thinning of the side walls is customer driven who want a more esthetic tub. This trend of freestanding tub with thin side walls is only a few years old. The thinner side walls of modern freestanding tub make it difficult to incorporate air distribution systems.

Figure 2:
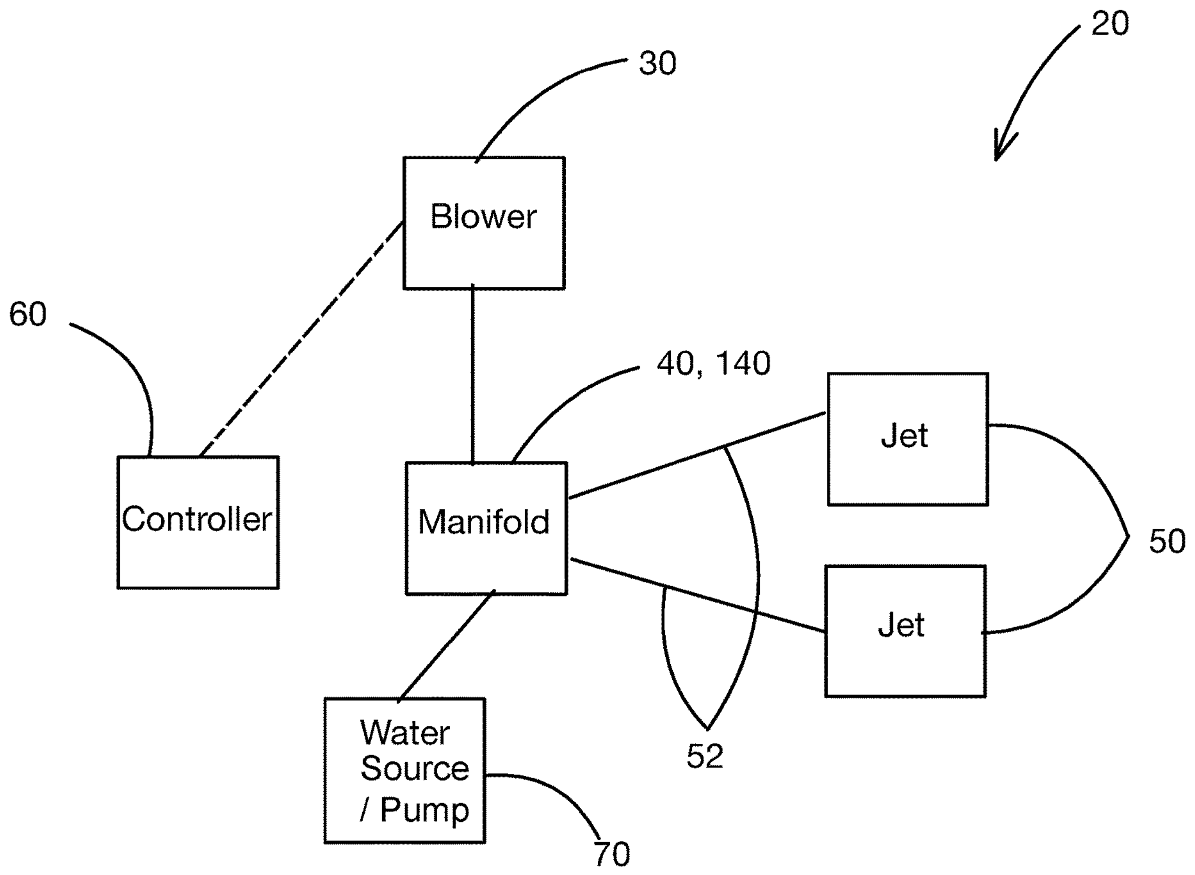
FIG. 2 is a schematic view of an air distribution system in accordance with one embodiment that may be used with the bath tub of FIG. 1.

Referring now to FIG. 2, the different components of the air distribution system 20 are shown schematically. In the embodiment shown, the air distribution system 20 may include a blower 30 that is operable to draw ambient air and push this drawn ambient air via one or more suitable conduits 52 to a manifold 40. Alternatives to a blower 30 include a fan, a ventilator, a pump, etc. The manifold 40 is pneumatically connected to the blower 30 and pneumatically connected to jets 50, only two being shown here for illustration purposes, for creating the massaging streams in the water of the tub 10. The manifold 40, as will be discussed below, is therefore able to divide the air received from the blower 30 between the different jets 50 of the system 20, such as via the conduits 52. In some cases, a water massage system may be used to create waves in the water. In the present disclosure, the expression "conduit" is intended to encompass any structure suitable for flowing a fluid, such as air and water. A conduit may be, for instance, a pipe, a hose, a tubular member, tubing, a channel, a passage, and so on.

The air distribution system 20 may include a controller 60 that is operatively connected to the blower 30 for controlling an amount of air injected in the tub 10 via the jets 50. The controller 60 may be operatively connected to the water massage system for selectively controlling which of a second set of jets (not shown) is injecting water, for procuring a different effect. Such a water massage system and controller is described in U.S. Pat. No. 7,503,082, the entire contents of which are incorporated herein by reference.

As explained above, for esthetic reasons, a thickness T (FIG. 1) of the bottoms 12 and sides 11 of the tub 10 is minimized or is kept small, such that the space 15 is of limited thickness. The space 15 between the inner and outer walls 13, 14 may be substantially filled with air. In some embodiments, an insulating material may be injected into the space 15 between the inner and outer walls 13, 14. With self-supporting tubs, the thickness T may be quite small. This makes the integration of the air distribution system 20 into the sides 11 and/or bottom 12 of the tub 10 quite challenging. The manifold 40 of the present disclosure may at least partially alleviate this drawback.

Figure 3:
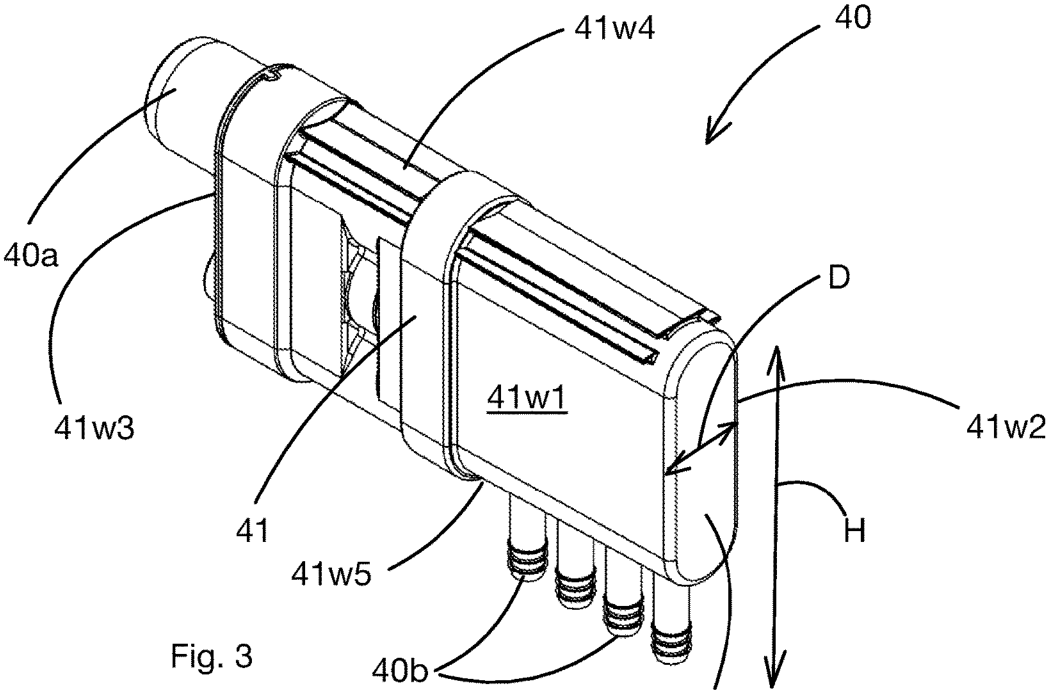
FIG. 3 is a three dimensional view of a manifold in accordance with one embodiment for the air distribution system of FIG. 2.
Figure 4:
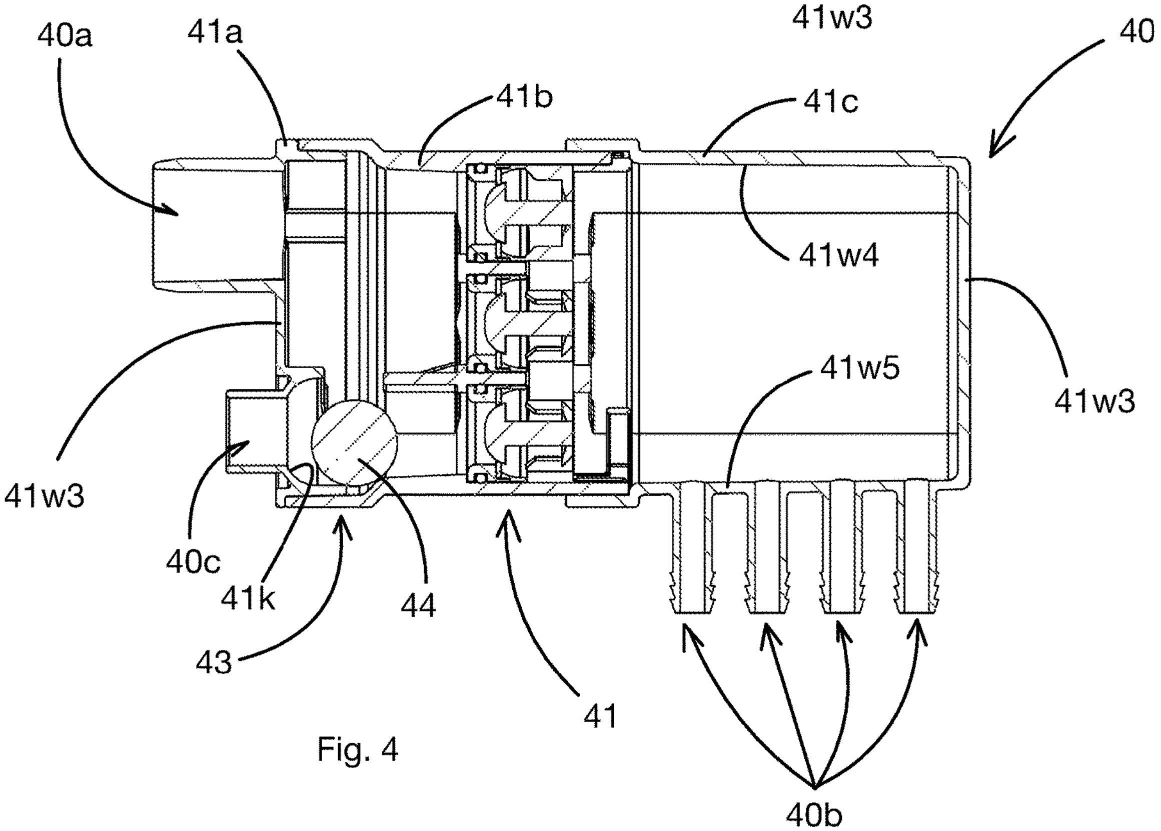
FIG. 4 is a cutaway view of the manifold of FIG. 3.

Referring now to FIGS. 3-6, the manifold 40 is described in greater detail. The manifold 40 has an inlet **40*a* that is pneumatically connected to the blower 30, and a plurality of outlets 40*b*. Four outlets 40*b* are shown in FIG. 4, but one or more outlets 40*b* are contemplated. Each of the four outlets 40*b* may be pneumatically connected to a respective one of four groups of the jets 50, via the conduits 52. A single outlet 40*b* may be present, for example with air distribution to various jets 50 being done downstream of the manifold 40. The manifold 40 may further have a water outlet 40*c* for expelling water out of the manifold 40 as described below, should water unwantingly reach the manifold 40. The water outlet 40*c* may be hydraulically connected to a drain of the tub 10. The water outlet 40*c* is strategically placed below the inlet 40*a***.

As shown in FIG. 3, the manifold 40 has a height H and a width D. The width D is selected to be less than an effective thickness of the space 15 between the inner and outer walls 13, 14. This effective thickness may correspond to the thickness T (FIG. 1) of the tub 10 from the inner walls 13 to the outer walls 14 minus the thicknesses of the inner walls 13 and of the outer walls 14. Features allowing this width D are discussed below. While the expression depth is used, dimension D may be regarded as the depth of the manifold 40. The height H is at least twice the width D.

The manifold 40 has a housing 41, that may also be known as a body, a casing, etc. The housing 41 is hollow—it has an inner cavity—, in that it defines a passage for air distribution. The housing 41 has the inlet 40*a*, the outlet(s) 40*b* and the water outlet 40*c*. More particularly, the housing 41 may be said to have three sections, namely, an inlet section 41*a*, a middle section 41*b*, and a distribution section 41*c*, well suited for mating assembly, with sections 41*a*, 41*b* and 41*c* each having as a main constituent a monolithic molded body, as a possibility, the monolithic molded bodies visible in FIG. 5. Only one section, two sections, or more than three sections are possible configurations for the housing 41. The inlet 40*a* and the water outlet 40*c* may be part of the inlet section 41, though the water outlet 40*c* could be elsewhere. The outlets 40*b* may be part of the distribution section 41*c* of the housing 41. In the embodiment shown, these three sections 41*a*, 41*b*, 41*c* of the housing 41 are secured to one another via overlapping joints in the mating assembly (typically with a cement), but any suitable means for fastening these sections, such as fasteners, glue, etc, are contemplated. Each of the three sections 41*a*, 41*b*, 41*c* may be in itself a monolithic part. In FIG. 3, a portion of the housing 41 is removed to show an interior thereof.

In the embodiment shown, the inlet 40*a* and the water outlet 40*c* of the manifold 40 are defined by tubular sections protruding from a remainder of the inlet section 41*a* of the housing 41. These tubular sections may be considered "male" connectors sized to engage a female connectors fastened to extremities of conduits, or with the conduits directly plugged to the inlet 40*a* and/or to the water outlet 40*c*. For instance, as shown, hose barb may be present on the male connectors, as a possibility among others. Other configurations are contemplated, for instance, the inlet 40*a* and/or the water outlet 40*c* may be "female" connectors to be engaged by male connectors of conduits.

In a variant, the middle section 41*b* of the housing 41 houses safety devices, depicted here as check valves 42, or like unidirectional flow devices. The check valves 42 or like devices may be in other locations than in the middle section 41*b* (if there is a middle section 41*b*). Three check valves 42 are provided in the manifold 40. The check valves 42 are aligned on top of one another in a vertical direction relative to the height H (FIG. 3) of the manifold 40. Each of the check valves 42 is able to allow air to flow from the inlet 40*a* to the outlets 40*b* and to generally prevent water from flowing from the outlets 40*b* back to the inlet 40*a* (i.e., water leaks may occur, such as when the check valves 42 are opened, hence the presence of the water outlet 40*c*). These safety features are used to block water from reaching the blower 30, which may be detrimental for its proper operation and safety. More or less than three check valves 42 may be used. The presence of multiple check valves (i.e., more than one) in a parallel set-up increases the volumetric flow capacity of the manifold 40, and thus the efficiency of the air distribution system 20, over a single check valve of the same shape. The redundancy of check valves 42 may also be useful in case of mechanical jam of one of the valves 42. In an embodiment, the central axes of the check valves 42 (i.e., of the flow passages they define) lie in a common plane. In an embodiment, in use, the common plane is generally parallel to gravity. In a particular embodiment, a single check valve having a vertically elongated inlet and outlet may be used without departing form the scope of the present disclosure.

Figure 5:
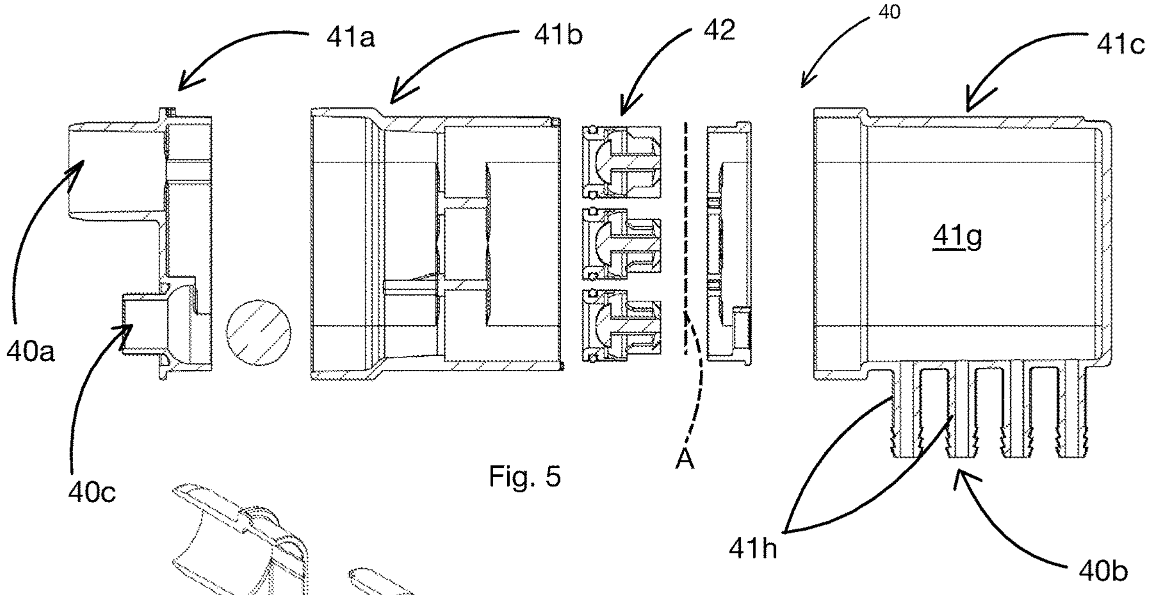
FIG. 5 is an exploded cutaway view of manifold of FIG. 4.
Figure 6:
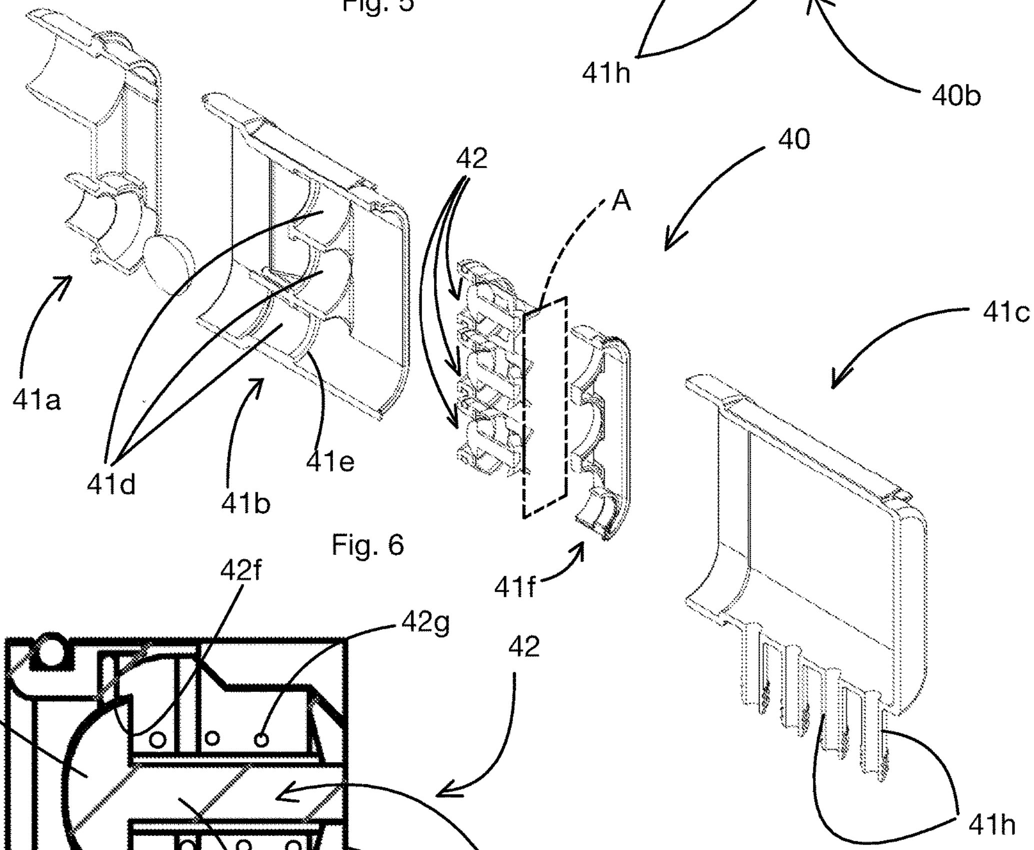
FIG. 6 is an exploded perspective cutaway view of the manifold of FIG. 4.

Referring more particularly to FIGS. 5-6, the middle section 41*b* of the housing 41 may define three cylindrical supports 41*d* each sized to receive a respective one of the three check valves 42 (there may be more or fewer). Each of those three cylindrical supports 41*d* may define an annular shoulder 41*e*, although other shapes are contemplated, against which a respective one of the check valve 42 abuts. An insert 41*f* has a portion received within the middle section 41*b* of the housing 41 and is in abutment against the check valves 42 to secure the check valves 42 relative to the housing 41. The check valves 42 are therefore sandwiched between the shoulders 41*e* and the insert 41*f*. The distribution section 41*c* of the housing 41 has a portion extending around the insert 41*f* and around a portion of the middle section 41*b* such that a portion of the middle section 41*b* is sandwiched between the insert 41*f* and the distribution section 41*c*. It is understood that this configuration is exemplary and that other methods of securing the three sections together are contemplated. For instance, each sections of the housing may be glued or welded to one another. Also, the check valve 42 may be secured to the housing 41 by other means. For instance, the check valves 42 may be glued, threaded, locked using a keyway and so on. In such instances, the insert 41*f* may not be necessary.

Still referring to FIGS. 5-6, the distribution section 41*c* of the housing 41 defines a plenum 41*g* that receives the air that passed through the check valves 42. This air is then divided into the plurality of outlets 40*b*. In the embodiment shown, each of the outlets 40*b* is a tubular member 41*h* protruding from a remainder of the distribution section 41*c* of the housing 41. These tubular members 41*h* are male connectors sized to engage female connectors of conduits, or conduits directly. The tubular members 41*h* may be barb fittings as shown. In the present case, retention grooves are defined at distal ends of the tubular members 41*h* of the outlets 40*b* to maintain a sealing engagement with a flexible hose. Other configurations are contemplated, such as threading, female tubing couplings, etc. The tubular members 41*h* project in a vertical direction relative to the height H of the manifold 40, i.e., in a direction generally aligned with the height H. This further contributes in maintaining the width D (FIG. 3) of the manifold 40 as small as possible to allow its insertion within the walls 11, 12 (FIG. 1) of the tub 10, i.e., in the space 15. The height of the housing 41, e.g., from the bottom wall 41*w*5 to the top wall 41*w*4, is at least twice the width of the housing 41, e.g., from wall 41*w*1 to wall 41*w*2. This may apply to any other housing described herein. The top wall 41*w*4 may have fins as observed, or like surface features, such that a bracket may attach the manifold 40 into the space 15, as one possible way to attach same.

Figure 7:
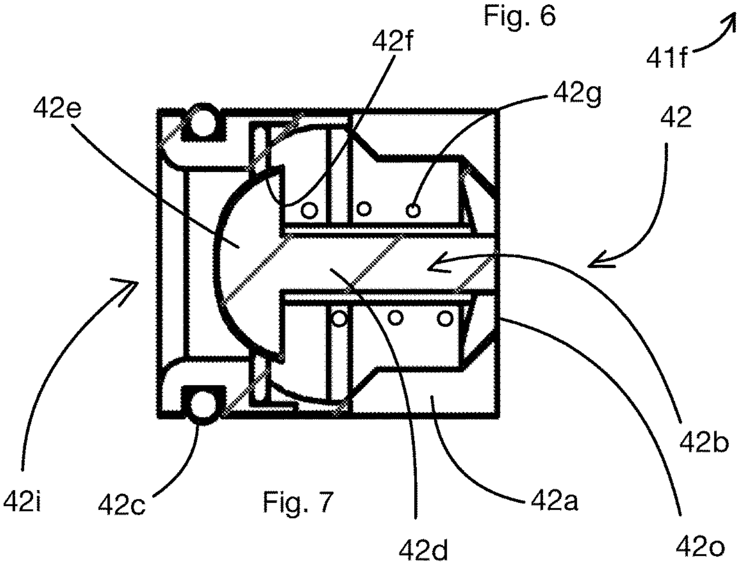
FIG. 7 is a cutaway view of a check valve in accordance with one embodiment for the manifold of FIG. 3.

Referring now to FIG. 7, an exemplary embodiment of the check valve 42 includes a valve housing 42*a* and a valve body 42*b* that is movable within the valve housing 42*a*. The valve housing 42*a* may define a groove to receive an optional sealing member 42*c*, which is depicted here as an O-ring. It will be understood that any means able to create a sealing engagement between the housing 42*a* of the check valve 42*a* and the housing 41 of the manifold 40 is contemplated. For instance, a press-fit between the housings 42*a* and the cylindrical supports 41*d* or a threading engagement between matching threads of the housings 42*a* and the cylindrical supports 41*d* are contemplated.

The valve body 42*b* has a shank 42*d* and a head 42*e* of a greater diameter than the shank 42*b*. A biasing member 42*g*, such as a spring, may be disposed around the shank 42*d* and exerts a biasing force against the head 42*e* of the valve body 42*b* to bias the head 42*e* in a sealing engagement against a valve seat 42*f* defined by the valve housing 42*a*. The check valve 42 has an inlet 42*i* and an outlet 42*o*. In use, air supplied by the blower 30 (FIG. 2) is directed toward the check valves 42. A pressure build-up upstream of the heads 42*e* results in a force against the head 42*e* of the valve body 42*b* to displace the valve body 42*b* relative to the seat 42*f* to allow the air to flow from the inlet 42*i* to the outlet 42*o* and between the head 42*e* and the seat 42*f* to reach the plenum 41*g* before being distributed between the outlets 40*b* of the manifold 40. When the blower 30 is turned off, water that might flow back from the network of conduits 52 (FIG. 2) toward the blower 30 is blocked if water flows into the outlet 42*o* of the check valve 42, as a result of the biasing action of the biasing member 42*g* pushing the head 42*e* against the seat 42*f* thereby generally preventing water to flow past the check valves 42 to protect the blower 30. The vertical stacking of the check valves 42 may also assist in reducing the amount of water that can trickle upstream, by reducing the width Dimension of passages, requiring a given water level for water to move upstream.

It will be understood that any suitable check valve may be used. For instance, a check valve having a flap that is hingedly connected to a housing to allow a fluid to flow solely in one direction may be used without departing from the scope of the present disclosure. A deformable diaphragm having a native shape by which the diaphragm closes the seat 42*f* may be an alternative among others. The expression "check valve" encompasses such unidirectional flow devices. As another possibility, solenoid valves may be present, though with the need to be powered.

Having more than one check valve 42 disposed atop one another along the height H of the manifold 40 may allow to reduce a size of the check valves 42 without compromising a mass flow rate of air flowing from the blower 30 to the jets 50. Hence, in the present case, the plurality of check valves 42 allows to decrease the width D of the manifold 40 relative to a manifold with a single circular check valve having the same mass flow rate as that of the manifold 40. Stated differently, the manifold 40 may fit within the thickness T (FIG. 1) of the sides or bottom 11, 12 of the tub 10 while keeping the mass flow rate of air from the blower 30 substantially the same as if one bigger check valve were used. As explained above, a single check valve having an elongated shape may be used, with a vertical orientation of the elongated shape. The one or more check valves 42 defines a flow output area A via which the air passes through to reach the manifold 41*g*. Whether the manifold has one or more check valves 42, the flow output area A has an aspect ratio greater than one. The aspect ratio may be defined as the height of the flow output area A, taken along the height H of the manifold 40, divided by the depth of the flow output area A, taken long the width D of the manifold 40. The aspect ratio of the flow output area A may be at least 2:1.

Referring back to FIG. 4, the manifold 40 includes a water relief valve 43 configured to allow water to exit the manifold 40 via the water outlet 40*c*. The water relieve valve 43 is defined by the first and second sections 41*a*, 41*b* of the housing 41 of the manifold 40 and is located upstream of the check valve 42 relative to a flow of air from the inlet 40*a* toward the outlet 40*b*. The water outlet 40*c* is located below the inlet 40*a*. In other words, the water outlet 40*c* is closer to the ground than the inlet 40*a* when the manifold 40 is installed in the tub 10 such that water that might flow back past the check valve 42 flows toward the water outlet 40*c* by gravity. The water outlet 40*c* may be hydraulically connected to drain of the tub 10, or to other piping item. This drain may be the same via which water is expelled from the tub 10, for instance with a check valve.

The water relief valve 43 includes a ball 44 that is movable within the housing 41 between a baseline position depicted in FIG. 4. The ball 44 blocks the water outlet 40*c* by gravity when the blower 30 is turned on or off. The raceway surrounding the water outlet 40*c* is sloped for the ball 44 to come into contact with a seat 41*k*. If water were to flow past the check valves 42, it would flow down by gravity toward the ball 44 to raise the ball 44 by buoyancy, and then exit the manifold 40 via the water outlet 40*c*. Accordingly, the ball 44 is made of a material allowing such buoyancy effect to raise it. The ball 44 defines a sealing engagement against the seat 41*k* defined by the housing 41. That is, as a result of gravity, the ball 44 is biased in a sealing engagement against the seat 41*k* thereby limiting air from exiting the manifold via the water outlet 40*c* to force the air received into the manifold 40 via the inlet 40*a* to flow through the check valves 42 toward the plenum 41*g* and outlets 40*b* of the manifold 40. Alternatives to the ball 44 include floats, etc. In a variant, there is no water relief valve 43 in the manifold 40, as water relief may occur downstream of the manifold 40. In a variant, if the water outlet 40*c* is present, a drain tube or pipe may be connected to the water outlet 40*c*, for water to be drained. A valve may be present in the drain tube or pipe so as to limit pressure drop through the water outlet 40*c*.

Referring to FIGS. 3-4, in the embodiment shown, the width D of the manifold 40 is defined between two walls of the housing 41 opposed to one another, namely, a front wall 41*w*1 and a rear wall 41*w*2. The front and rear walls 41*w*1, 41*w*2 are interconnected with two side walls 41*w*3, a top wall 41*w*4 and a bottom wall 41*w*5. While the walls 41*w*1-41*w*5 are described as discrete walls, they may be part of a monoblock component and/or may have smooth junctions between them. In a variant, at least some of the walls 41*w*1-41*w*5 have main planes, but the top and bottom walls 41*w* and 41*w*5 may be arcuate or semi-cylidrical, as observed. In an embodiment, all of the inlets and outlets of the manifold 40, namely, the air inlet 40*a*, the air outlets 40*b*, and the water outlet 40*c* are defined through the two side walls 41*w*3, the top wall 40*w*4, and/or the bottom wall 40*w*5 to keep the front and rear walls 41*w*1, 41*w*2 free of connection to maintain the width D minimal. Hence, in the embodiment shown, the maximum width D is the distance from the front wall 41*w*1 to the rear wall 41*w*2. The air inlet 40*a* and the water outlet 40*c* may be defined through one of the two side walls 41*w*3. The air outlets 40*b* may be defined through the bottom wall 40*w*5. In an embodiment, the various inlets and outlets are located between a plane of the front wall 41*w*1 and a plane of the rear wall 41*w*2. In an embodiment, central axes of the inlets and outlets are generally parallel (±10 degrees) to one of both of these planes (if the planes are parallel).

Referring back to FIG. 2, in a particular embodiment, hot water from a water source 70 (which may include a pump) may be injected into the manifold 40 to heat the air before said air is injected into the tub 10 via the jets 50. The water source 70 may be, for instance, a hot water supply line of a building or the water taken from the tub 10. A heat exchanger may be present, or hot water may be entrained into the air stream.

Referring now to FIGS. 8-11, a manifold in accordance with another embodiment is shown at 140. The manifold 140 may be able to mix air with water as explained above to inject warm air into the tub 10 via the jet 50. For the sake of conciseness, only elements that differ from the manifold 40 described above with reference to FIGS. 3-7 are described below.

Figure 8:
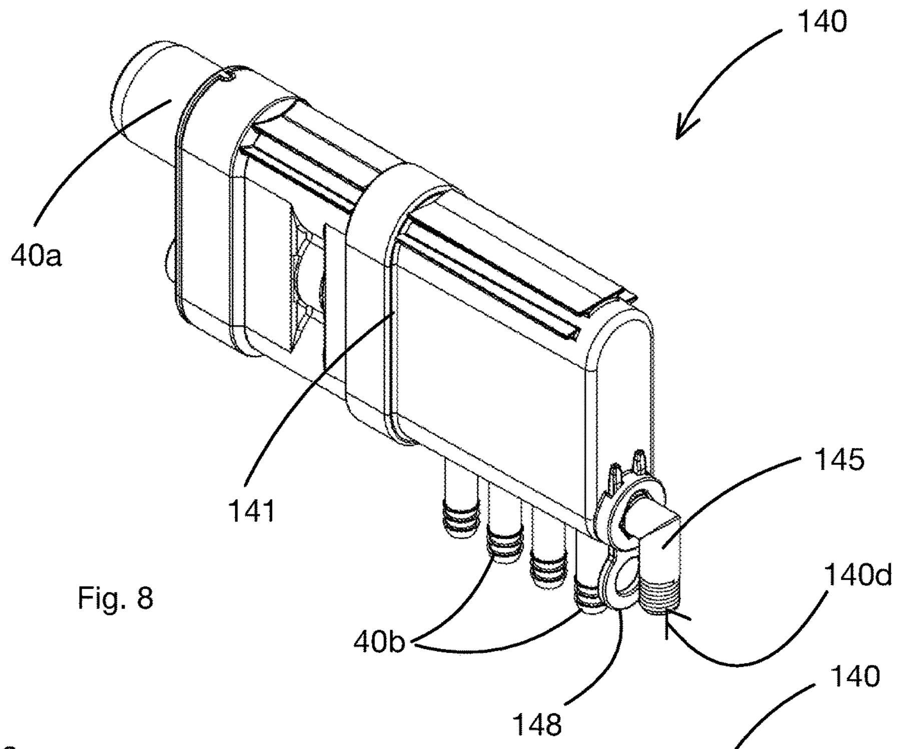
FIG. 8 is a perspective view of a manifold in accordance with one embodiment for the air distribution system of FIG. 2.

In the embodiment shown, the manifold 140 defines a water inlet 140*d* that is hydraulically connected to the water source 70 (FIG. 2). The water inlet 140*d* is defined through one of the side walls 141*w*3 of the housing 141 to maintain the width D of the manifold 140 as small as possible. The water inlet 140*d* may alternatively be defined through the bottom wall of the housing 141. In the embodiment shown, the water inlet 140*d* is part of a conduit 145. The conduit 145 has a coupling end for connection with a hose or other suitable conduit to flow water from the water source 70 to the water inlet 140*d*. The conduit 145 is partially received into the housing 141 via an opening 141*l* defined therethrough. The opening 141*l* is, in the embodiment shown, located in the third section 141*c* of the housing 141 and is defined in a face of the manifold 140 that extends along the width D of the manifold such that the conduit 145 is oriented lengthwise in the manifold 140 and does not increase the depth of the manifold 140. The opening 141*l* may be positioned in any of a top, side, or bottom face of the housing 141. In some applications where more space is available, the opening 141*l* may be elsewhere, or may be downstream of the manifold 140. In FIG. 8, a portion of the housing 141 is removed to show an interior thereof.

Figure 9:
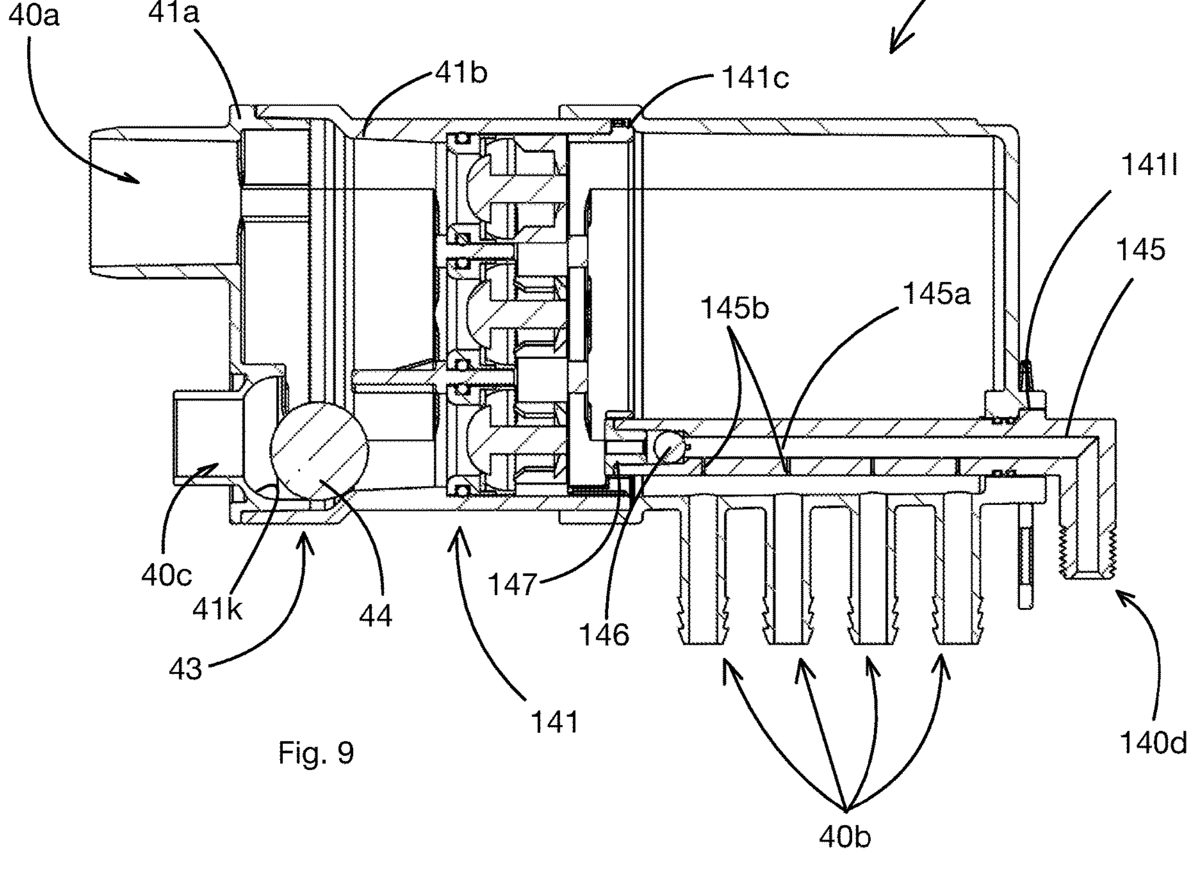
FIG. 9 is a cutaway view of the manifold of FIG. 8.

Referring more particularly to FIG. 9, the conduit 145 defines an inner passage 145*a* through which water flows. A plurality of radial passages 145*b* each fluidly communicating with the inner passage 145*a* and distributed along a length of the conduit 145. In the embodiment shown, a number of the radial passages 145*b* corresponds to a number of the outlets 40*b*, and are generally aligned. Each of the radial passages 145*b* may be aligned with and oriented toward a respective one of the outlets 40*b*. In an embodiment, projections of axes of the radial passages 145*b* pass through an opening of the outlets 40*b*. The radial passages 145*b* need not be perfectly radial and may extend in any direction having a radial component relative to a central axis of the inner passage 145*a*. Therefore, water injected into the conduit 145 via the water inlet 140*d* of the manifold 140 is distributed between the outlets 40*b* and injected into the outlets 40*b* for heating the air. A mix of air and water is therefore injected into the tub 10 via the jets 50. The diameter of the radial passages 145*b* is at least five times smaller that the diameter of the outlets 40*b*. In an embodiment, the flow rate of air, and the temperature, result in a partial vaporization of the water exiting the conduit 145.

Figure 10:
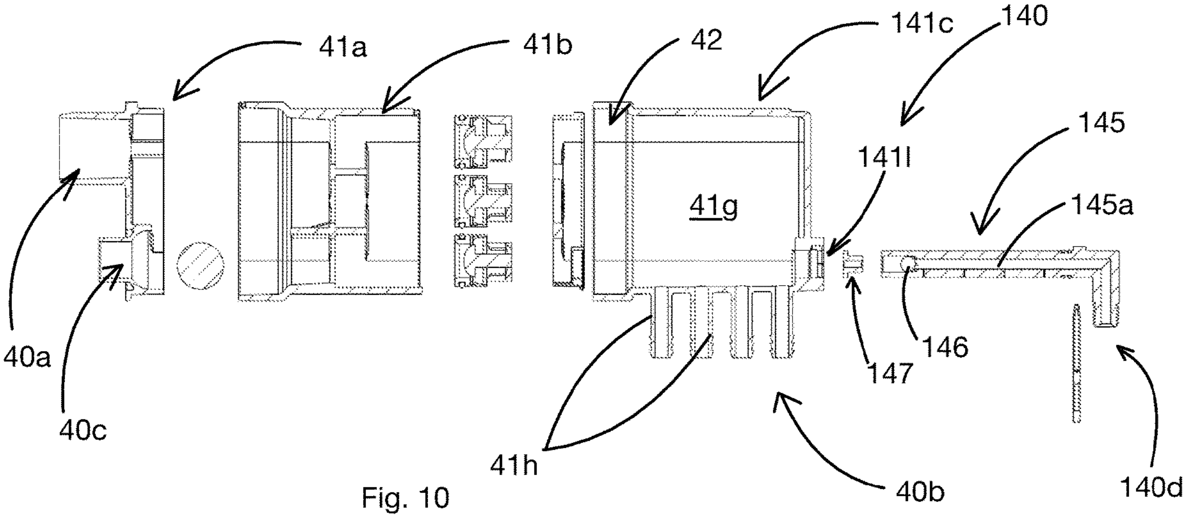
FIG. 10 is an exploded cutaway view of manifold of FIG. 8.
Figure 11:
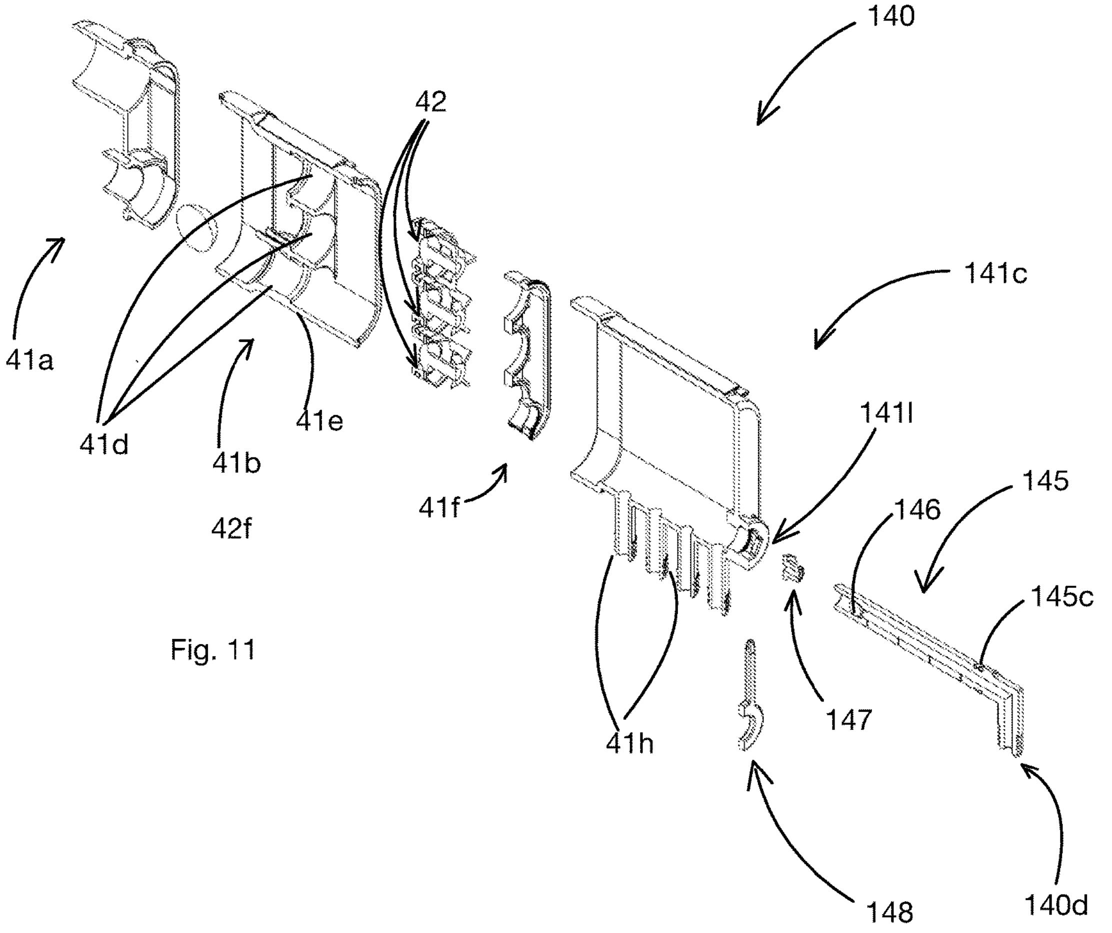
FIG. 11 is an exploded perspective cutaway view of the manifold of FIG. 8.
Figure 12:
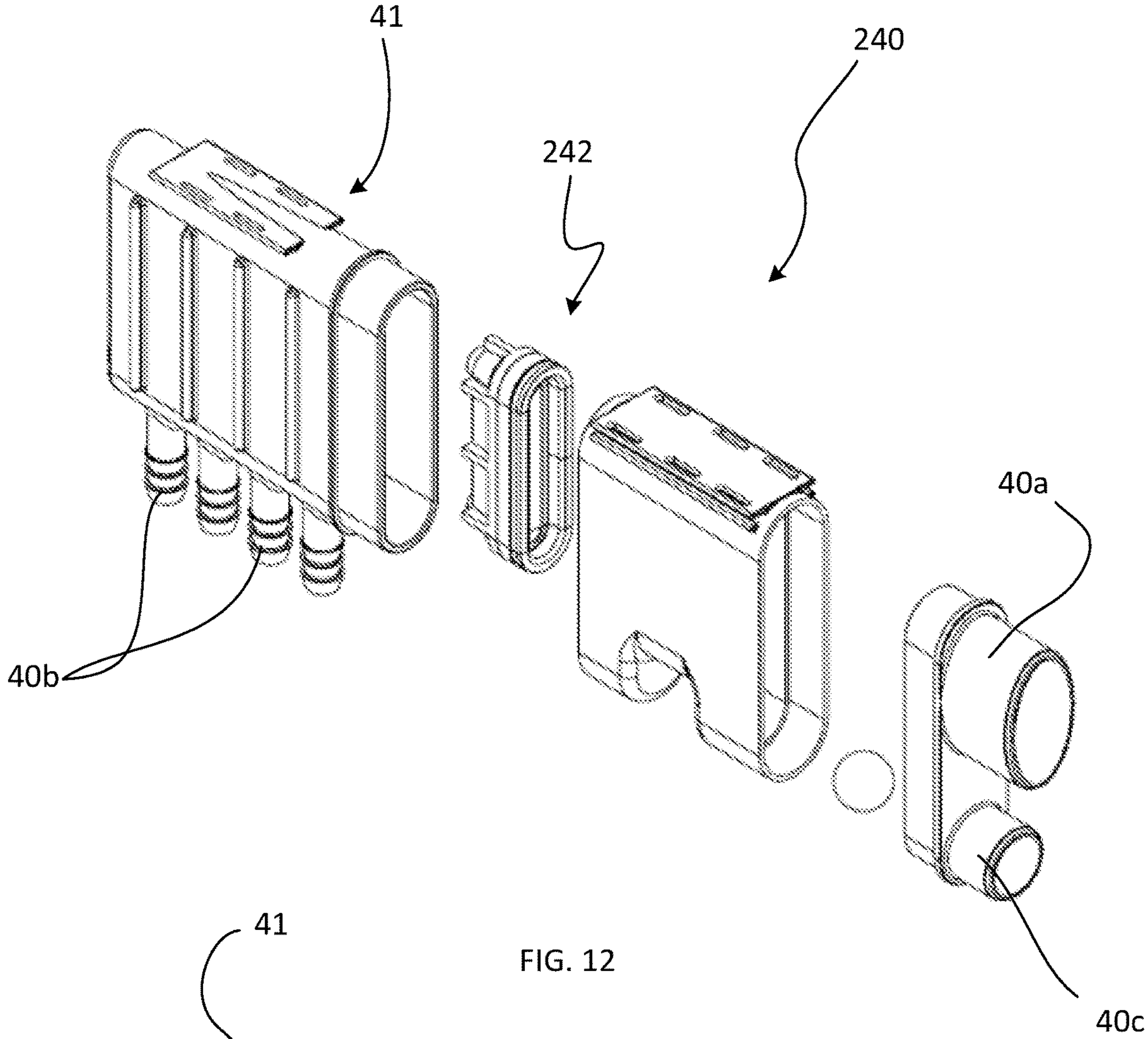
FIG. 12 is an exploded three dimensional view of a manifold in accordance with another embodiment for the air distribution system of FIG. 2.
Figure 13:
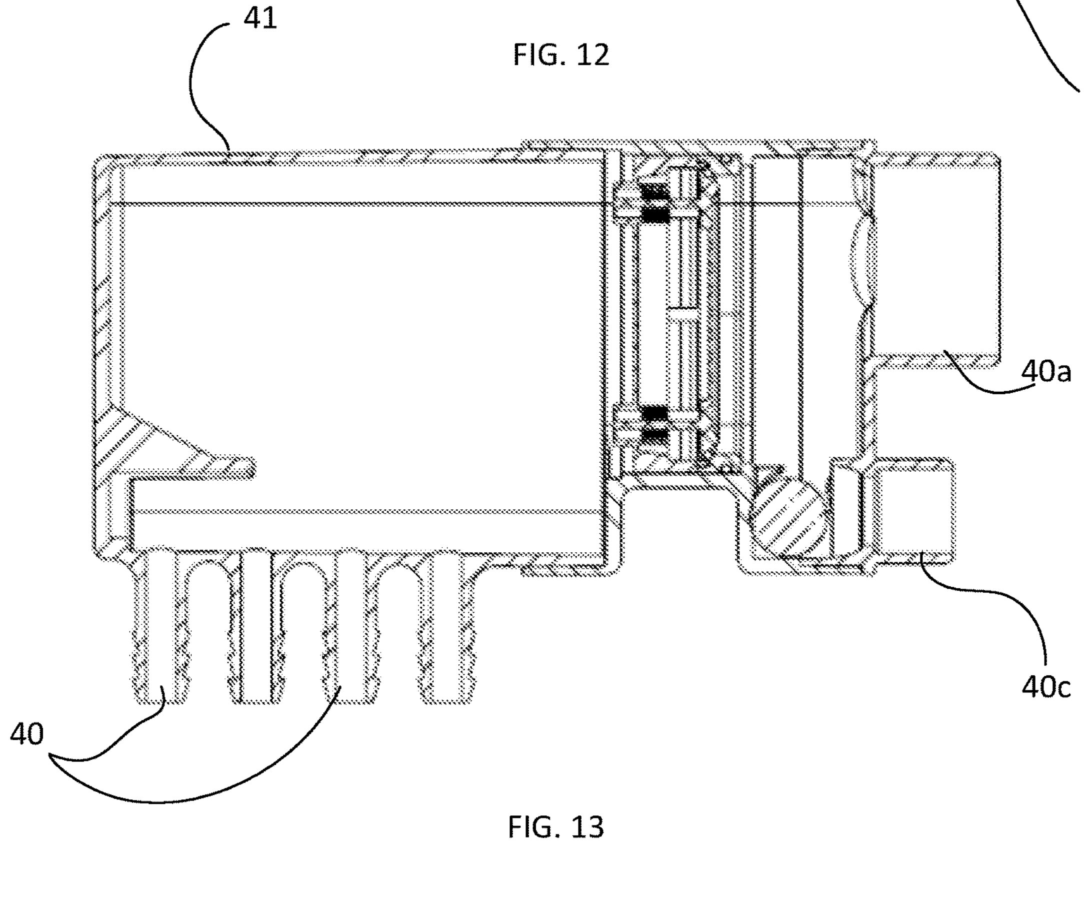
FIG. 13 is a cutaway view of the manifold of FIG. 12.
Figure 14:
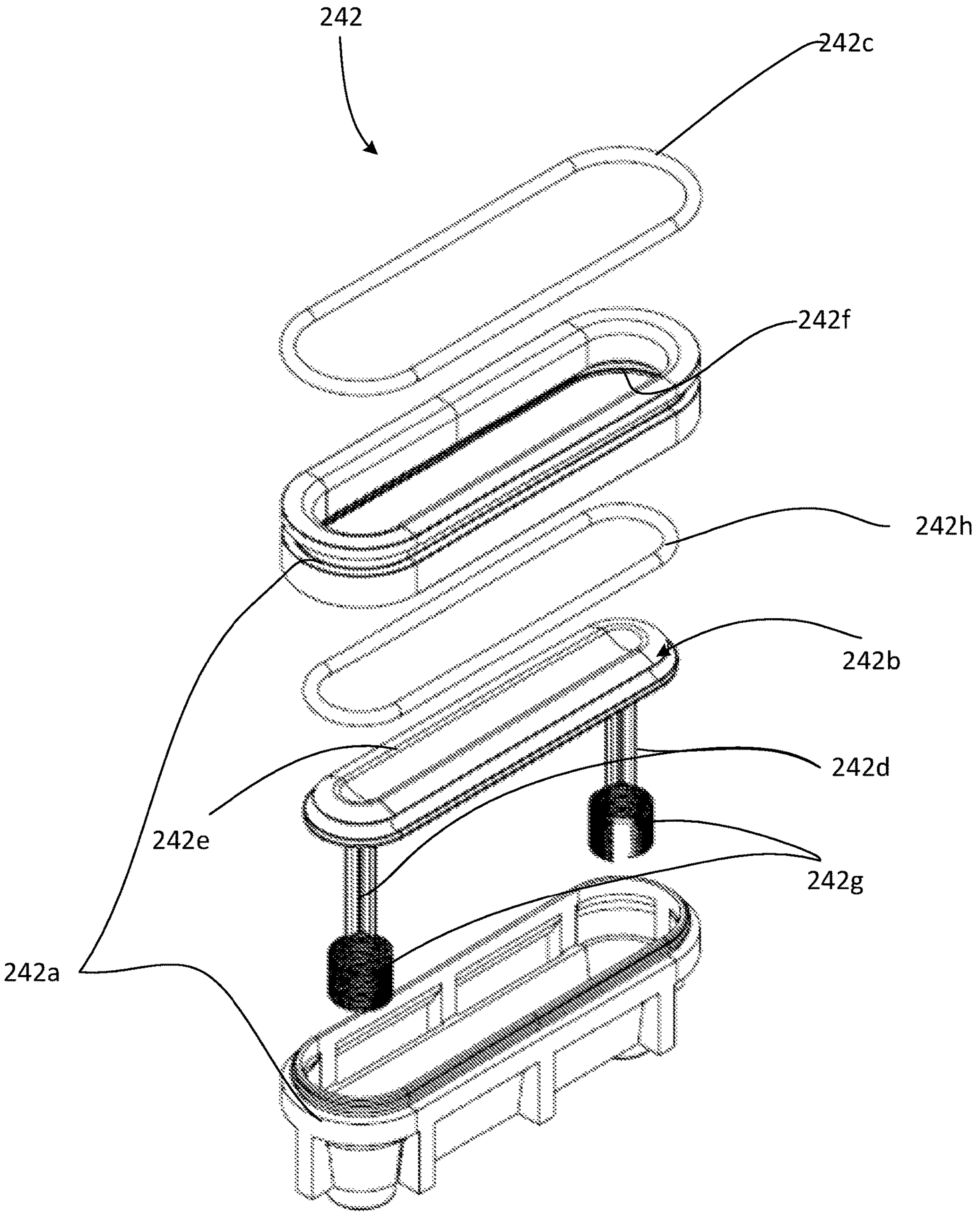
FIG. 14 is a perspective exploded view of a check valve for the manifold of FIG. 12.
Figure 15:
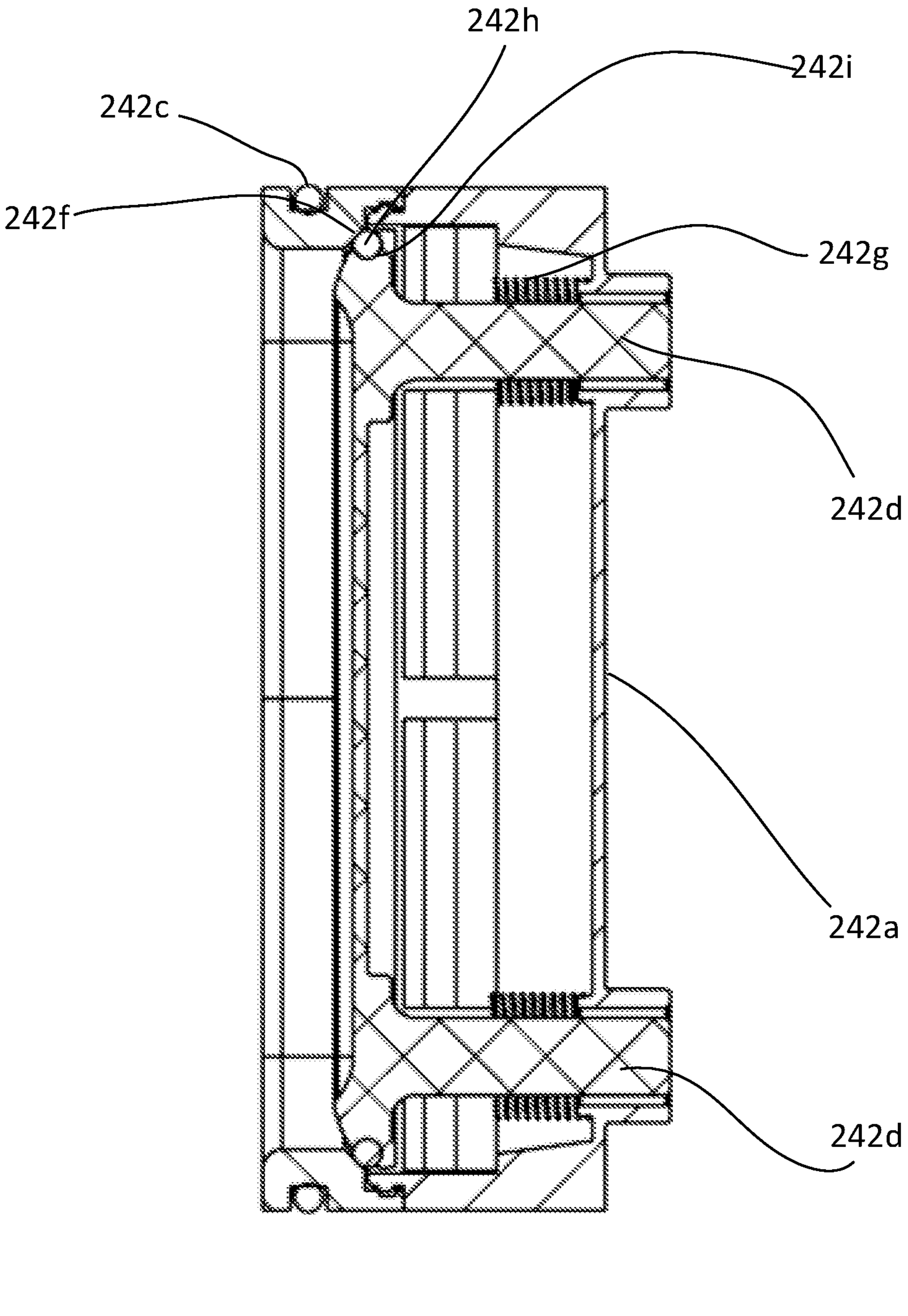
FIG. 15 is a cutaway view of the check valve of FIG. 14.

Referring more particularly to FIGS. 9-11, a distal end of the conduit 145 at the opposite extremity of the water inlet 140*d* is selectively opened or closed via a ball 146. The inner passage 145*a* of the conduit 145 increases in inner diameter proximate the distal end to receive the ball 146. A sleeve 147 is received within the inner passage 145*a* such that the ball 146 is movable between a shoulder defined by the conduit 145 where the diameter changes and the sleeve 147. The sleeve 147 defines an inner passage. In use, when water is injected into the conduit 145 via the water inlet 140*d*, the ball 146 is pushed in sealing engagement against a seat defined by the sleeve 147 to ensure that the water exits the conduit 145 solely by the radial passages 145*b* and that water is generally prevented from leaking into the plenum 41*g*. If it becomes required to purge the conduit 145 from water, the water source may be disconnected from the conduit 145 and the air from the blower 30 pushes the ball 146 away from the seat of the sleeve 147 to allow air to flow in the internal passage 145*a* of the conduit 145 to purge said conduit, e.g., via the outlets 40*b* or water outlet 40*c*. Grooves may be defined at the shoulder of the conduit 145 to ensure that air can flow past the ball 146 into the conduit 145 when the water source is disconnected.

Referring to FIGS. 8 and 11, to secure the conduit 145 to the manifold 140, the conduit 145 is inserted into the manifold 140 and a locking pin 148 is inserted through one or more aperture defined by a connecting portion of the housing 141. In the embodiment shown, the locking pin 148 defines two prongs each receivable within a respective one of two apertures defined by the housing 141. Once the two prongs of the locking pin 148 are received into the manifold 140, they engage a groove 145*c* (FIG. 11) defined by the conduit 145 to lock the conduit relative to the housing 141. This locking pin 148 may allow to selectively install or remove the conduit 145 without having to rotate the conduit 145, which might require more space than available in the walls of the tub 10. If the conduit 145 is removed, a plug may be used to prevent air from leaking out of the manifold 141. Other means of locking the conduit 145 to the housing 141 may be used, such as, a dog and slot, a keyway, a cutter pin, and so on.

The disclosed manifold 40 may be able to distribute the required mass flow rate of air from the blower 30 while being able to fit within the thickness T (FIG. 1) of the side walls 11 (FIG. 1) of the tub 10. The disclosed manifold 40 may offer two levels of protection: the one or more check valve 42 and the water relief valve 43, to prevent water from being ingested by the blower 30. These two levels of protection may avoid the use of a Hartford loop. The manifold 140 may inject hot water to the air form the blower 10 to provide a hot air feeling in the tub 10. Moreover, the features of the manifolds 40, 140 described above, that are, namely, the increase in aspect ratio of the flow output area A and the different ports on the side and/or bottom walls of the manifolds 40, 140 may allow the manifold 40, 140 to be received within the side walls 11 of the freestanding tub 10.

Referring to FIGS. 12-15, another embodiment of a manifold is shown at 240. For the sake of conciseness, only elements that differ from the manifold 40 described above with reference to FIGS. 3-7 are described below.

In the embodiment shown, the manifold 240 includes a single check valve 242 that has an oblong shape, or other elongated shaped (e.g., rectangular). In other words, the check valve 242 has a height greater than its depth, in an orientation of use. The check valve 242 may be in accordance with the aspect ratio described hereinabove. The check valve 242 includes a valve housing 242*a* and a valve body 242*b* that is movable within the valve housing 242*a*. The valve housing 242*a* may define a groove to receive a sealing member 242*c*, which is depicted here as an O-ring. It will be understood that any means able to create a sealing engagement between the housing 242*a* of the check valve 242 and the housing 41 of the manifold 240 is contemplated. For instance, a press-fit between the housings 242*a* and the cylindrical supports 41*d* or a threading engagement between matching threads of the housings 42*a* and the cylindrical supports 41*d* are contemplated.

The valve body 242*b* has two shanks 242*d*, although more or less than two shanks is contemplated, and a head 242*e* of a greater dimension than the shanks 242*d*. The plurality of shanks 242*d* may ensure a strictly translational movement of the check valve 242. Biasing members 242*g*, such as a spring, may be disposed around the shanks 242*d* and exert a biasing force against the head 242*e* of the valve body 242*b* to bias the head 242*e* in a sealing engagement against a valve seat 242*f* defined by the valve housing 242*a*. In the embodiment, a sealing member 242*h*, such as an O-ring, may be received within a groove 242*i* defined by the head 242*e* of the valve body 242*b*. The sealing member 242*h* is biased against the valve seat 242*f*. Any other suitable shape for the head 242*e* of the check valve 242 is contemplated, such as, oval, oblong, rectangular, and so on. In an embodiment, the presence of a single check valve 242 reduces the number of parts, and may also reduce overall friction, for the single check valve 242 to be more responsive than a series of check valves.

As can be seen therefore, the examples described above and illustrated are intended to be exemplary only. The scope is indicated by the appended claims.

What is claimed is:

1. A manifold for an air massage system of a tub comprising:

a housing defining an inner cavity having an air inlet configured to be pneumatically connected to a pressure source, at least one air outlet configured to be pneumatically connected to one or more outlets of the tub, and a check valve in the inner cavity of the housing, the check valve being positioned between the air inlet and the at least one air outlet relative to an air flow through the housing, the check valve allowing fluid communication from the air inlet to the at least one air outlet and blocking water from flowing from the at least one air outlet to the air inlet, wherein a width of the manifold is less than a height of the manifold, and wherein the check valve has a valve body movable relative to a valve housing, the valve body having a height greater than a width, whereby the check valve defines a flow output area, an aspect ratio of the flow output area of height relative to width being greater than one.

2. The manifold according to claim 1, wherein the aspect ratio of the flow output area is at least 2:1.

3. The manifold according to claim 1, wherein the housing has a front wall and a rear wall, the width of the manifold extending from a plane of the front wall to a plane of the rear wall.

4. The manifold according to claim 3, wherein the air inlet, and the at least one air outlet are located in any wall connecting the front wall to the rear wall.

5. The manifold according to claim 1, further including a water outlet in fluid communication with the inner cavity of the housing.

6. The manifold according to claim 5, wherein the water outlet is upstream of the at least one-check valve.

7. The manifold according to claim 5, wherein the water outlet is part of a water relief valve.

8. The manifold according to claim 1, further comprising a water inlet hydraulically connectable to a water source.

9. The manifold according to claim 1, wherein the at least one air outlet includes a plurality of air outlets, wherein the air outlets of the plurality are distributed along a longitudinal axis of the housing.

10. The manifold according to claim 9, wherein the housing defines a plenum, the plenum communicating with each of the air outlets, the plenum having a plenum width less than a plenum height.

11. The manifold according to claim 1, wherein the check valve has an oblong shape.

12. The manifold according to claim 1, wherein a height of the housing is at least twice a width of the housing.

13. The manifold according to claim 1, wherein the housing has an inlet section, a distribution section, and a middle section between the inlet section and the distribution section, wherein the inlet section, the middle section and the distribution section concurrently define the inner cavity of the housing.

14. The manifold according to claim 13, wherein the inlet section, the middle section and the distribution section are interconnected by overlapping joints.

15. The manifold according to claim 13, wherein the air inlet is in the inlet section, the at least one air outlet is in the distribution section, and the check valve is in the middle section.

16. The manifold according to claim 13, wherein each of the inlet section, the middle section and the distribution section has a monolithic body.

17. An assembly comprising:

a freestanding tub having an inner space between an inner wall and an outer wall;

an air massage system including a pressure source, jets in fluid communication with a bathing cavity of the tub, the manifold according to claim 1 located in the inner space, and a network interconnecting the pressure source, the jets and the manifold.

18. A manifold for an air massage system of a tub comprising:

a housing defining an inner cavity having an air inlet configured to be pneumatically connected to a pressure source, at least one air outlet configured to be pneumatically connected to one or more outlets of the tub, and a single check valve in the inner cavity of the housing, the check valve being positioned between the air inlet and the at least one air outlet relative to an air flow through the housing, the check valve allowing fluid communication from the air inlet to the at least one air outlet and blocking water from flowing from the at least one air outlet to the air inlet, wherein a width of the manifold is less than a height of the manifold, and wherein the check valve has a movable portion to open/close a passage of the check valve, the movable portion having an oblong shape defining a height greater than a width, whereby the check valve defines a flow output area, an aspect ratio of the flow output area of height relative to width being greater than one.

19. A manifold for an air massage system of a tub comprising:

a housing defining an inner cavity having an air inlet configured to be pneumatically connected to a pressure source, at least one air outlet configured to be pneumatically connected to one or more outlets of the tub, and a single check valve in the inner cavity of the housing, the check valve being positioned between the air inlet and the at least one air outlet relative to an air flow through the housing, the check valve allowing fluid communication from the air inlet to the at least one air outlet and blocking water from flowing from the at least one air outlet to the air inlet, wherein a width of the manifold is less than a height of the manifold, and wherein the check valve has a movable flap to open/close a passage of the check valve, the movable flap having an oblong shape defining a height greater than a width, whereby the check valve defines a flow output area, an aspect ratio of the flow output area of height relative to width being greater than one.

* * * * *